United States Patent [19]

Wolfe

[11] 4,001,948
[45] Jan. 11, 1977

[54] LIGHT RESPONSE TEACHING SYSTEM

[76] Inventor: Stanley Wolfe, P.O. Box 205, Booneville, Ark. 72927

[22] Filed: Sept. 29, 1975

[21] Appl. No.: 617,836

[52] U.S. Cl. .................................. 35/9 R; 35/9 B; 35/22 R

[51] Int. Cl.² ........................................ G09B 7/06

[58] Field of Search ............ 35/8 R, 9 R, 9 A, 9 B, 35/9 C, 9 E, 22 R, 35 R, 35 C, 48 R

[56] References Cited

UNITED STATES PATENTS

| | | | |
|---|---|---|---|
| 3,172,215 | 3/1965 | Ragen | 35/35 R |
| 3,254,431 | 6/1966 | Baker | 35/48 R |
| 3,382,588 | 5/1968 | Serrell et al. | 35/9 A |
| 3,508,349 | 4/1970 | Gilden et al. | 35/9 B X |
| 3,516,176 | 6/1970 | Cleary et al. | 35/9 B |
| 3,605,286 | 9/1971 | Plumly | 35/9 A |
| 3,609,878 | 10/1971 | Bender | 35/9 A |
| 3,696,525 | 10/1972 | Cleary | 35/9 B |
| 3,698,100 | 10/1972 | Frank | 35/9 A |
| 3,763,577 | 10/1973 | Goodson | 35/48 R |

Primary Examiner—Anton O. Oechsle
Assistant Examiner—Vance Y. Hum
Attorney, Agent, or Firm—Hill, Gross, Simpson, Van Santen, Steadman, Chiara & Simpson

[57] ABSTRACT

A light response teaching system has a display board with a plurality of illuminated panels having touch sensitive switches associated therewith. Cards having learning indicia printed on a transparent portion are placed in front of each of the illuminated panels. Control panel switches and associated circuitry permit selection and control of panel light illumination for three modes of operation: a selecting mode, a matching mode, and a scanning mode. In each of the operational modes, the various learning indicia cards are selectively illuminated to reinforce a pupil's comprehension of pictures, letters, symbols, or written words through visual reception.

8 Claims, 9 Drawing Figures

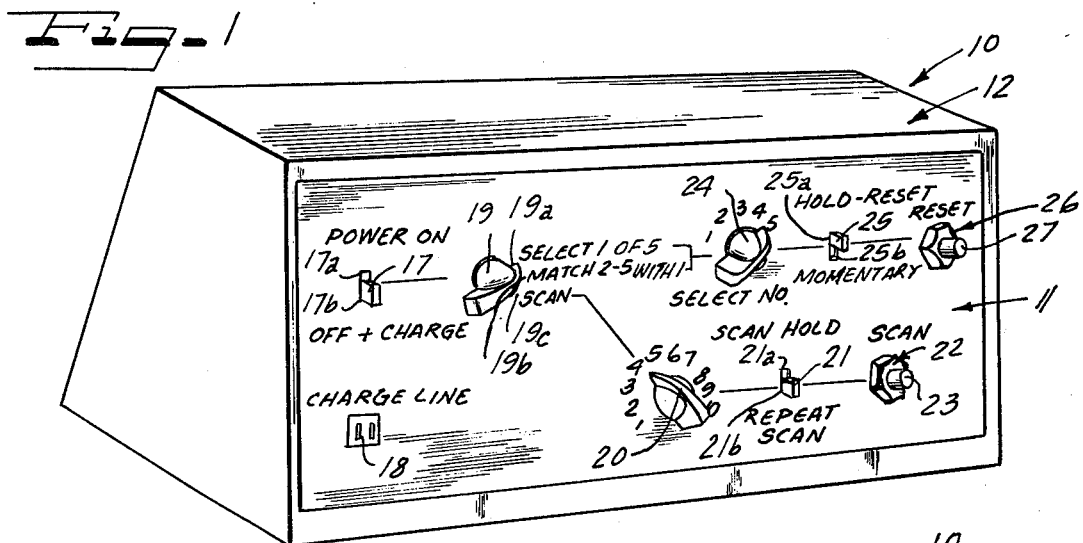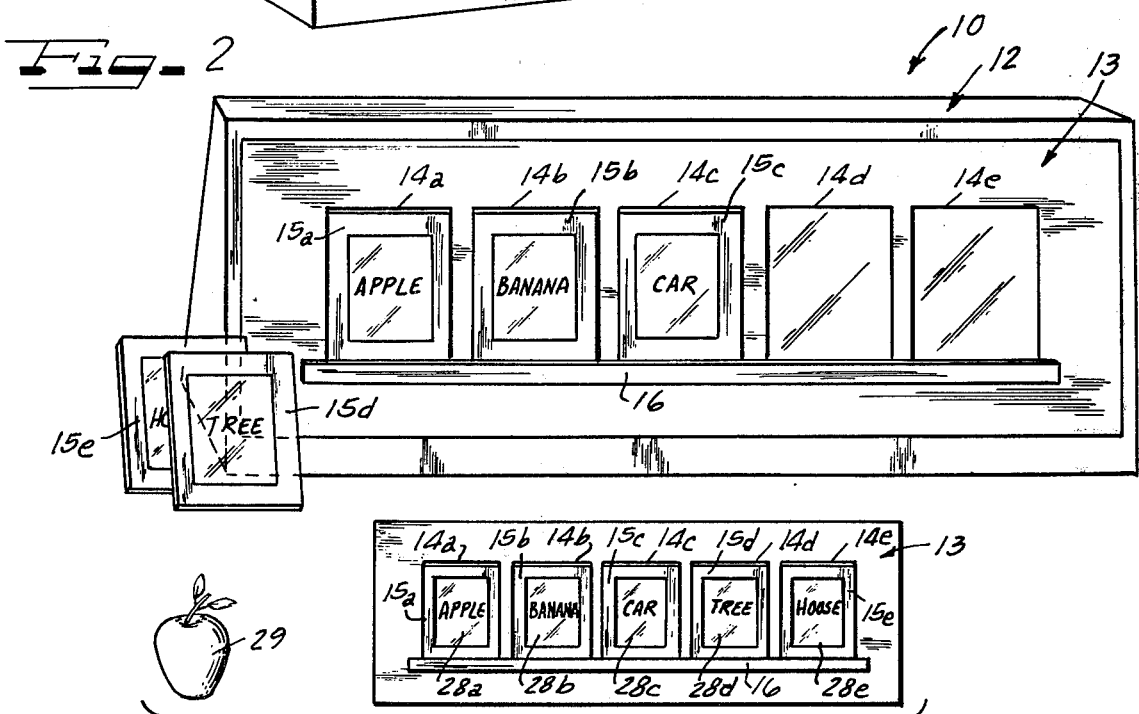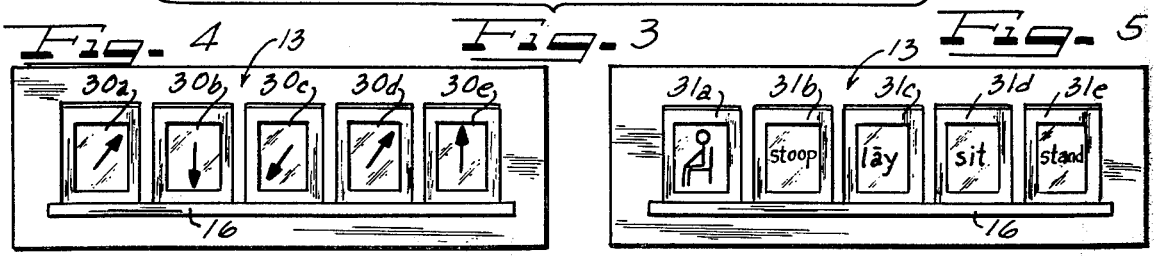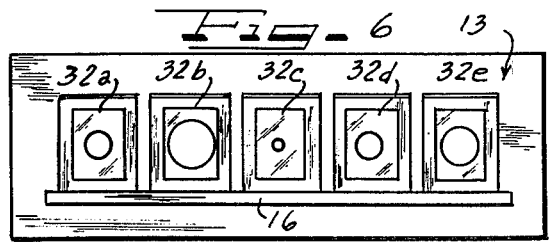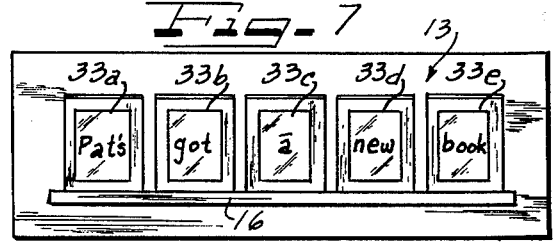

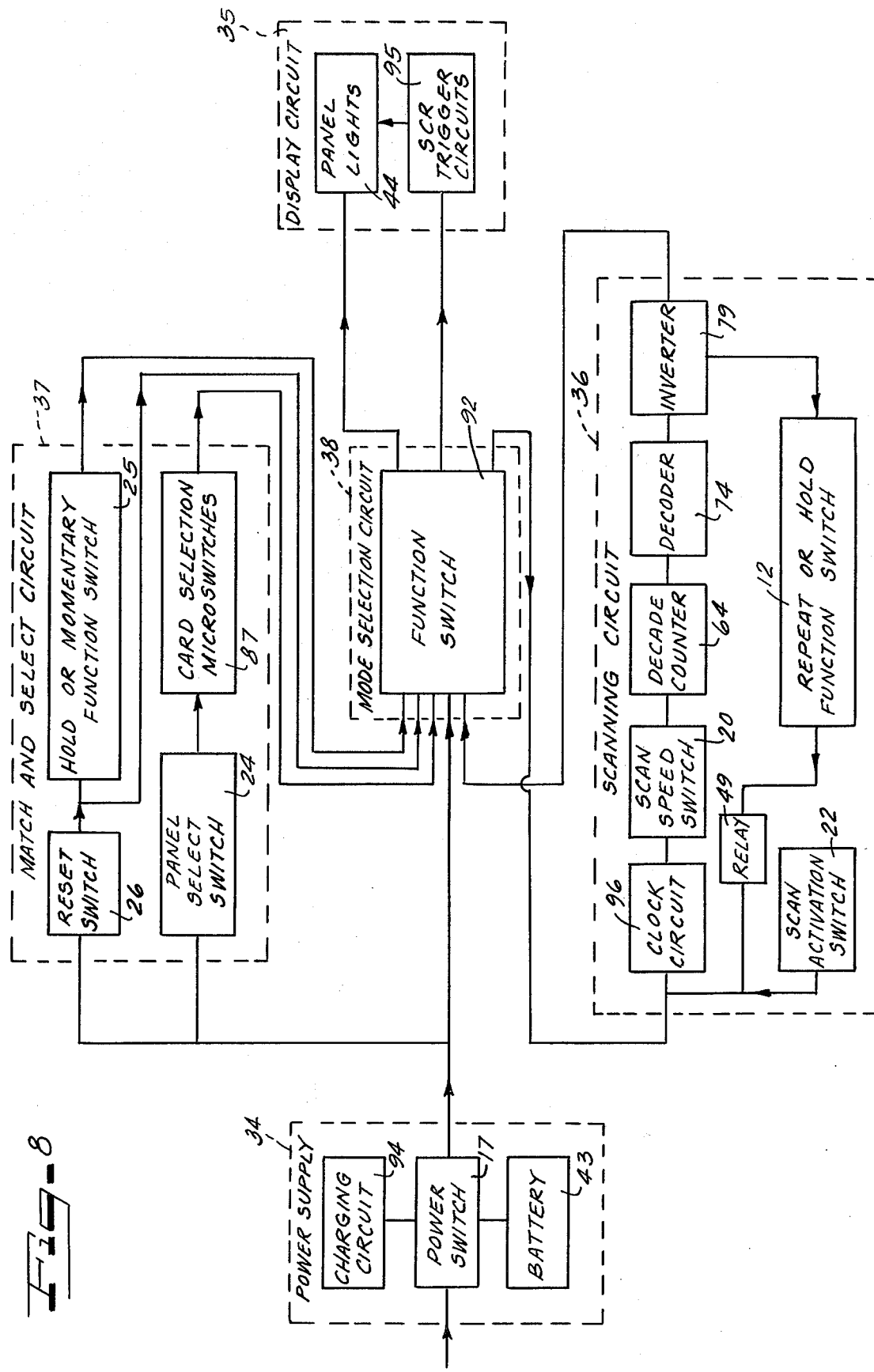

LIGHT RESPONSE TEACHING SYSTEM

BACKGROUND OF THE INVENTION

1. Field of the Invention

This invention relates to light response teaching systems and more particularly to a system employing selecting, scanning, and matching modes of operation.

2. Prior Art

U.S. Pats. Nos. 3,609,878, to Bender, Cleary 3,516,176, Ragen 3,172,215, Matsumoto 3,675,341 and Reinnagel 2,498,578 separately disclose some of the conceptual features of the invention disclosed herein. Bender and Cleary suggest the use of touch detecting panels. Ragen suggests sequential scanning of a series of panels. Matsumoto illustrates matching of one panel with another. Finally, Reinnagel has a selector switch to preselect a panel later selected by a child. Although various modes of operation for a light response teaching system are known, the various modes have been combined in a single device which is both inexpensive and convenient to use.

SUMMARY OF THE INVENTION

It is known that many pupils have problems in visual reception which are due to discrimination difficulties. As a child develops, he first learns the process of generalization. Later he learns discrimination. Use of a teaching device having a selecting mode of operation and a matching mode of operation is highly desirable. Furthermore, it is important for a child to learn through ocular fixation, by inspecting symbols and forms. And to improve ocular span, a child should learn to select important items from among many. A teaching system having a mode of operation for allowing the child to inspect and then select symbols as a response to a question posed is desirable. Similarly the mode of operation in which a child matches one letter or symbol with another letter or symbol is desirable.

Also, it is important to teach a child ocular sweep to enable a child to realign symbols, such as a line of print, from left to right. A light response teaching system which provides a controllable sequence of individually lighted learning indicia such as syllables of a word or words of a sentence would be desirable for teaching ocular sweep.

Therefore, it is highly desirable to provide a light response teaching system for reinforcing ocular fixation, ocular span, and ocular sweep. Such a system should be capable of performing the operational modes of matching, selecting and scanning in a single unit which is simple to operate, inexpensive, and appealing to students.

According to the present invention, a light response teaching system comprises a display circuit having illumination means adjacent a plurality of panels for illuminating a single learning indicia card received by each panel. The display circuit is controlled to perform the functions of matching, selecting, and scanning by various control circuits. A scanning circuit causes the illumination means to sequentially illuminate the learning indicia cards according to a prearranged pattern. A matching and selecting circuit causes the display circuit to illuminate the panel and associated learning indicia preselected by a system operator on a panel select switch. When a pupil activates a card selection switch associated with one of the learning indicia cards chosen, the panel will illuminate if it was preselected as a correct response by the system operator. Also, in a matching mode of operation, the matching and selecting circuit causes one of the panels to remain illuminated and permits one of the other panels to light if it was preselected as a match and the pupil activates the appropriate card selection switch associated with that panel.

A mode selection circuit connected to the display circuit, scanning circuit and matching and select circuit, preselects the desired mode of operation; matching, selecting, or scanning.

A power supply is connected to at least one of the display, scanning, matching and selecting and mode selection circuits for supplying power to the system.

BRIEF DESCRIPTION OF THE DRAWINGS

FIG. 1 is a perspective view of a control panel of a light response teaching device of this invention;

FIG. 2 is a perspective view of a display board of the light response teaching device of this invention;

FIG. 3 is a fragmentary side view of the display board having a set of learning indicia cards thereon for a selecting mode of operation;

FIGS. 4–6 are fragmentary side views of the display board illustrating sets of learning indicia cards for a matching mode of operation;

FIG. 7 is a fragmentary side view of a display panel with a set of learning indicia cards thereon for a scanning mode of operation;

FIG. 8 is a schematic block diagram of the circuitry for the light response teaching system of this invention.

DESCRIPTION OF THE PREFERRED EMBODIMENT

Figure 9:
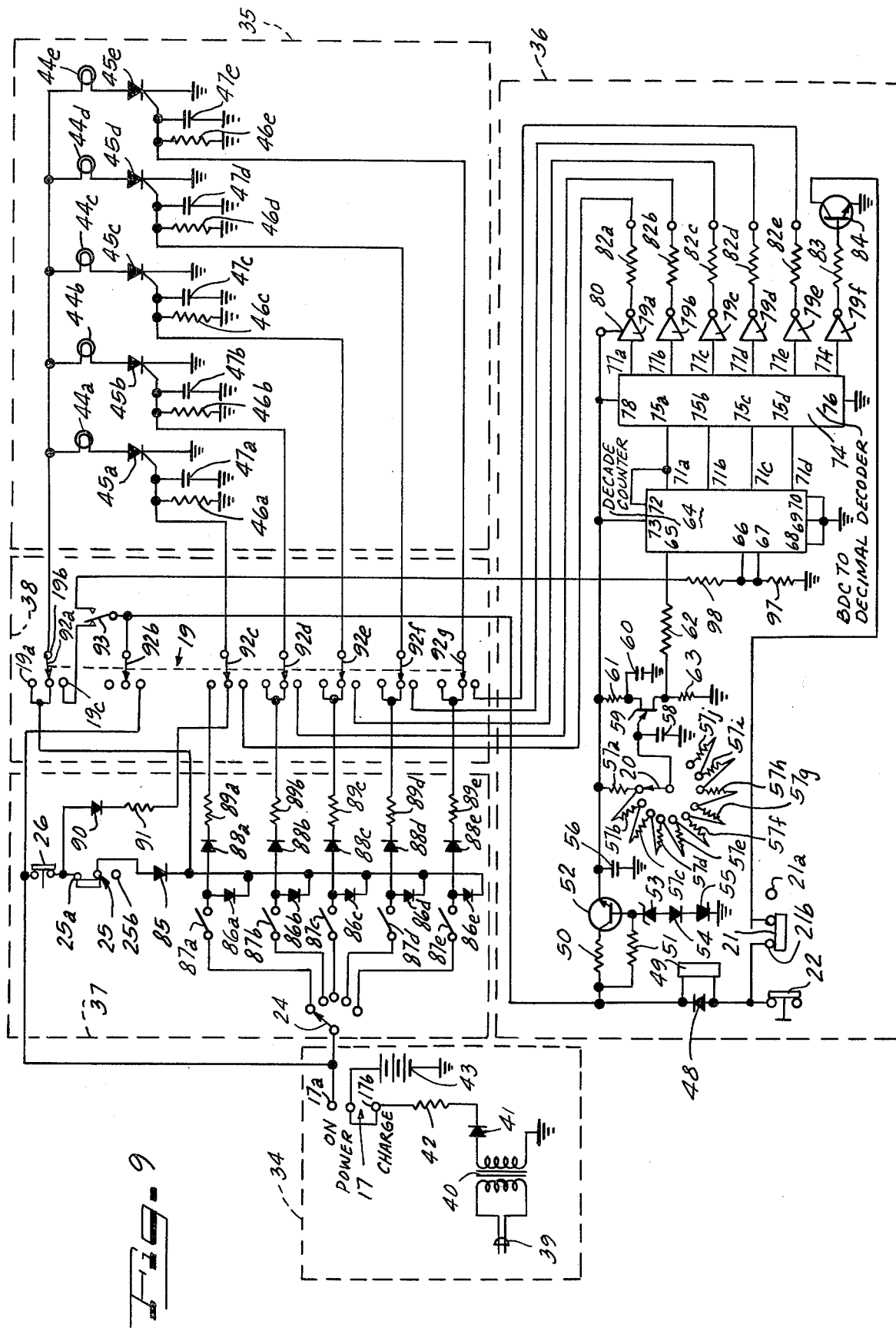
FIG. 9 is a schematic diagram of the circuitry of this invention.

The principles of the present invention are particularly useful when embodied in a light response teaching system as shown in FIGS. 1 and 2, generally indicated by the numeral 10.

FIG. 1 illustrates a control panel 11 which is operated by a teacher for instructing a pupil. Both control panel 11 and a display board 13, shown most clearly in FIG. 2, are mounted as end faces on a cabinet 12. Illuminated touch sensitive panels 14a–e are provided in a horizontal row on the display board 13. Learning cards 15a–e having a transparent or translucent portions with learning indicia imprinted thereon are arranged in front of the panels 14a–e on a ledge 16.

The control panel 11 has a power switch 17 with a "power-on" position 17a and an "off-charge" position 17b. A charge line plug 18 is provided adjacent the power switch 17. A function switch 19 is provided having a "select 1 of 5" position 19a, a "match 2–5 with 1" position 19b, and a "scan" position 19c.

To control a scanning mode of operation, a ten position speed selector switch 20 is provided in which each of the steps of the switch corresponds to approximately a one second scan interval between successive panel-illuminations. A scanning function switch 21 having a "scan and hold" position 21a and a "repeat scan" position 21b is provided adjacent the speed selector switch 20. Scanning activation switch 22 having a push button 23 is arranged adjacent the function switch 21.

For control of the "select 1 of 5" or "match 2–5 with 1" modes, a five position panel select switch 24 is provided for which each position corresponds to one of the panels 14a–e. A match and select mode function switch 25, having a "hold-reset" position 25a and a "momentary" position 25b, is positioned adjacent the panel select switch 24. A reset switch 26 having a push button 27 is arranged adjacent the function switch 25.

FIGS. 3 through 7 illustrate various arrangements of learning indicia as employed with the light response teaching system of this invention.

The learning indicia set 28a–e, illustrated in FIG. 3, is useful when the invention is operated in a selecting ("select 1 of 5") mode. An object, such as an apple 29 to be identified is displayed to the pupil. The pupil then touches the indicia 28a–e which corresponds to the correct answer. When the indicia is touched, a microswitch cooperating with the associated panel is triggered and, if the answer is correct, the panel illuminates the selected indicia. In FIG. 4, card 28a, with the word "APPLE", would illuminate, if selected. Rather than displaying an object 29, a question may be passed to the student.

FIGS. 4, 5 and 6 illustrate sets of learning indicia employed with the system of the invention in a matching ("Match 2–5 with 1") mode of operation. In FIG. 4, learning indicia cards 30a–e are presented to the child. Card 30a is illuminated continuously as a basis for matching. The pupil then selects a matching figure 30b–e. If the correct indicia is selected, in this case, the arrow of card 30a matching with the arrow of 30d, the indicia will be illuminated when the child touches the indicia and associated panel. Similarly, in FIG. 5, learning indicia 31a–e are presented and a correct match will be indicated to the child when he touches indicia card 31d, thus matching the seated figure of card 31a with the word "SIT" of card 31d. Again, in FIG. 6, learning indicia card 32a having a circle imprinted thereon is continuously lit. When the child touches the indicia card 32d with a similar circle for testing depth perception, a match is indicated to the child by illumination of indicia card 32d.

In FIG. 7, a set of indicia 33a–e is presented to the child and the teaching system of this invention is operated in a scanning mode. The panels associated with learning indicia 33a–e are then sequentially lit from left to right and the student is requested to pronounce the words on the learning indicia cards as they become illuminated. To initiate the scanning mode, the function switch 19 is switched to scanning position 19c. The speed selector 20 is then positioned to provide the sequential timing desired. If the scanning function switch 21 is in the "repeat scan" position 21b, the sequential lighting of the learning indicia is repeated. To conserve on battery power, scanning activation switch 22 must be continually depressed during the scanning mode.

By use of the selecting, matching, and scanning modes of operation as exemplified in FIGS. 3 through 7, three important learning activities are performed by a single device: 1) learning to read through ocular fixation, to inspect symbols and forms (selecting mode); 2) learning ocular span, so the child can learn to select an important item among many (matching mode); and 3) learning ocular sweep, to enable a child to read a line of symbols such as a line of print, from left to right (scanning mode).

The circuitry functions of this invention are most easily understood by referring to the block diagram of FIG. 8. A power supply circuit 34 is provided having a line cord input to a power switch 17. The power switch 17 then either connects a battery 43 into the circuit or connects charging circuit 94 to charge the battery 43. Power from the power supply 34 is then fed to the match and select circuit 37 and the mode selection circuit 38. The display circuit 35 comprises panel lights 44 connected to SCR trigger circuits 95. Power for the panel lights is supplied by an output from the mode selection circuit 38. Control of the panel lights is performed by the SCR trigger circuits 95. These circuits are further controlled by an output from the mode selection circuit 38. The scanning circuit 36 and match and select circuit 37 define the types of trigger signals to present to the SCR trigger circuits 95 for selectively applying power to the panel lights 44 in accordance with the type of operational mode selected.

The scanning circuit 36 comprises a clock circuit 96 having a power input from the mode selection circuit 38 which is activated when the circuit is in the scanning mode position. Clock circuit 96 generates a series of pulses having a timing interval determined by the setting of the scan speed switch 20. Decade counter 64 counts the clock pulses and presents the results to a four line binary output. The binary output of the decade counter 64 is decoded to decimal sequence by decoder 74. Inverter 79, following the decoder 74, inverts the decimal outputs to the proper polarity for driving the SCRs. The panel lights 44 are lit in sequential order and each remain lit until one of the digital output lines of the decoder 74 operates a relay 49 which removes power from the SCRs, thus turning the lamps off. The repeat or hold function switch 21 determines whether the scanning sequence should be repeated. An output from the inverter 79 is connected to the mode selection circuit for connection to the SCR trigger circuit 95 when the mode selection circuit 38 is in the scanning mode. A scan activation switch 22 is connected to the input of the clock circuit 96 and permits the clock circuit to generate pulses only when the switch 22 is activated.

The match and select circuit 37 provides appropriate trigger signals for the matching and selecting modes. Panel select switches 24 are connected in series with card selection microswitches 87. When the card selection microswitch corresponding to the position of the panel select switch is depressed, power is coupled from the power supply 34 to the mode selection circuit 38. A reset switch 26 removes power temporarily to extinguish the panel lights 44 after a selected panel has been lit. A hold or momentary function switch 25, connected to the power supply through the reset switch 26, causes the panel light selected to either remain lit or to be extinguished after the child releases the appropriate microswitch 87. An input to the mode selection circuit 38 is provided at the junction of the reset switch 26 and function switch 25. Also, outputs from the function switch 25 and microswitches 87 are coupled to the mode selection circuit 38.

The mode selection circuit 38 has as its principal element a function switch 92 having outputs which supply power to the panel lights 44 and which also connect with the SCR trigger circuits 95.

Referring now to FIG. 9, the specific circuitry utilized to achieve the advantageous functions of the invention is disclosed. A detailed description of that circuitry will now be presented. Dotted lines surrounding various portions of the circuit in FIG. 9 correspond to the dotted line circuit blocks of FIG. 8.

Power supply circuit 34 comprises a line plug 39 connected to a stepdown transformer 40. The output from this transformer is rectified by rectifier 41 and coupled through a resistor 42 to the power switch 17. In the "charge" position 17b, a battery 43 may be charged. An "on" position 17a of the power switch 17 connects the battery 43 to a central pole of the panel select switch 24.

Display circuit 35 comprises five lamps 44a-e which are grounded through SCR's 45a-e. Capacitors 47a-e and resistors 46a-e bypass a gate of each of the SCRs 45a-e to prevent accidental triggering. Power is fed to each of the lamps 44a-e by commonly connecting the lamps in parallel. Scan circuit 36 has a relay coil 49 with a diode 48 connected in parallel. One end of the relay coil 49 is connected to a collector of transistor 52 through resistor 50. A base of transistor 52 connects through a resistor 51 to the end of the relay coil 49. A zener diode 53 and diodes 54 and 55 are connected in series between the base of transistor 52 and ground. A capacitor 56 bypasses an emitter of transistor 52 to ground. A ten-position scanning speed selector switch 20 has its first position connected to the emitter of transistor 52 through a resistor 57a. Resistors 57b-j bridge each of the adjacent positions of selector switch 20 and are all connected in series. A central pole of the switch 20 is bypassed to ground by capacitor 58 and also connects with the gate of the uni-junction transistor (UJT) 59. The drain source channel of the UJT 59 has one end bypassed to ground through a capacitor 60 and is also connected by a resistor 61 to the emitter of transistor 52. The other end of the drain-source channel is grounded through resistor 63 and is coupled by resistor 62 to an input pin 65 of the decade counter 64. Pins 66 and 67 of the decade counter are grounded through resistor 97 and also coupled by a resistor 98 to switch contacts 93 of the relay coil 49. Decade counter pin 68, 69, and 70 are interconnected and grounded. Power input pin 73 of the decade counter 64 connects with the emitter of transistor 52. Output pins 71a-d connect with input pins 75a-d of the decimal decoder 74. Pins 71a and 72 of the decade counter are joined. Pin 76 of the decimal decoder 74 is grounded and pin 78 has power supplied thereto from the emitter of transistor 52. Output pins 77a-f are respectively connected to inverter sections 79a-f. Power is supplied to these inverters at input pin 80 from the emitter of transistor 52. An output from each of the inverter sections 79a-e respectively connects resistors 82a-e. Inverter section 79f has a resistor 83 which couples the inverter to a base of the grounded emitter stage transistor 84. The collector of transistor 84 provides feedback from the decoder to the scanning mode function switch 21 central terminal. In a "repeat scan" position 21b, a digital output signal from the decoder 74 is coupled to the relay coil 49 and also to the scan activation switch 22.

The match and select circuit 37 has a reset switch 26 connected to a power line from the power supply 34. The other end of the reset swtich 26 connects through a series connected of a diode 90 and a resistor 91 to the function switch 92. Reset switch 26 also connects with the "hold-reset" position 25a of the match and select circuit function switch 25. The "momentary" position 25b of the switch 25 is not connected. The central terminal of the switch 25 connects through a diode 85 to the function switch 92 and also to each of the diodes 86a-e respectively. The five-position panel select switch 24 has power applied to its common terminal. One end of each microswitch 87a-e is connected to one of the position terminals, respectively. The other end of each microswitch 87a-e respectively connects through diodes 88a-e and resistors 89a-e to the "select 1 of 5" terminals of the function switch wafers 92c-g.

The common pole on each of the function switch wafers 92c-g respectively connects with the gate of each of the SCRs 45a-e, respectively. The selecting mode terminal 19a of each of the wafers 92c-g connects with resistors 89a-e respectively. The matching mode terminal 19b of each of the wafers 92d-g connects with resistor 89b-e respectively. The matching mode terminal 19b of the wafer 92c connects with resistor 91 and diode 90 from the reset switch 26. The "scan" terminal 19c of the wafers 92c-g respectively connects with the scanning circuit outputs provided at resistors 82a-e. Wafer 92a of the function switch 92 has its common terminal connected to the lights 44a-e for supplying power thereto. The "select 1 of 5" and "match 2 of 5 with 1" terminals 19a and 19b of this wafer are commonly connected to the junction of diodes 85 and 86a. The scanning mode terminal of wafer 92a connects to one terminal of relay switch 93. The common contact terminal of relay switch contacts 93 connects to the common terminal of wafer 92b for the function switch 92. On this wafer, scanning terminal 19c connects with the power supply and the other terminal is blank.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A light response teaching device adapted for training pupils by selectively illuminating a plurality of learning indicia cards, comprising:
    a. a display circuit means having illumination means adjacent a plurality of panels for illuminating a single learning indicia card received by each panel;
    b. scanning circuit means for causing said illumination means to sequentially illuminate said learning indicia cards according to a pre-arranged pattern;
    c. match and select circuit means having a panel select switch and also including a card selection switch adjacent each of said panels,
        i. said match and select circuit means causing said display circuit means to illuminate the panel preselected by said panel select switch when one of said card selection switches is activated by the pupil, and
        ii. said match and select circuit means also causing one of said panels to remain illuminated and causing said display means to illuminate one of the other panels preselected by said panel select switch when one of said card selection switches is activated by the pupil;
    d. a mode selection circuit means connected to said display circuit means, scanning circuit means, and match and select circuit means and being effective to alternately preselect a matching, selecting, and scanning mode of operation; and
    e. power supply means connected to at least one of said display, scanning, match and select, and mode selection circuit means for supplying power to all of said circuit means.

2. A light response teaching device of claim 1 in which said display circuit means comprises a panel light adjacent a translucent panel and a trigger means connected to each panel light.

3. A light response teaching device of claim 1 in which said trigger means comprises an SCR.

4. A light response teaching device of claim 1 in which said scanning circuit means includes a scan speed switch for selectively repeating and for selectively holding a scan sequence.

5. A light response teaching device of claim 1 in which said match and select circuit means includes a reset switch and a function switch for momentary and prolonged illumination of a preselected panel.

6. A light response teaching device of claim 1 in which said card selection switch is a microswitch in contact with the panel, said panel being movable.

7. A light response teaching device of claim 1 in which said mode selection circuit means includes a three-position function switch.

8. A light response teaching device of claim 1 in which said power supply connects to said match and select circuit means and also connects to said scanning circuit means through said mode selection circuit means.

* * * * *